United States Patent
Koshida et al.

(10) Patent No.: US 7,513,947 B2
(45) Date of Patent: *Apr. 7, 2009

(54) COLORED THERMOPLASTIC RESIN COMPOSITIONS FOR LASER WELDING, SPECIFIC NEUTRAL ANTHRAQUINONE DYES AS COLORANTS THEREFOR, AND MOLDED PRODUCT THEREFROM

(75) Inventors: Reiko Koshida, Utsunomiya (JP); Yoshiteru Hatase, Osaka (JP); Ryuichi Hayashi, Tokyo (JP); Hiroyuki Sumi, Tochigi-ken (JP)

(73) Assignee: EI Du Pont de Nemours and Company, Wilmington, DE (US)

( * ) Notice: Subject to any disclaimer, the term of this patent is extended or adjusted under 35 U.S.C. 154(b) by 467 days.

This patent is subject to a terminal disclaimer.

(21) Appl. No.: 11/175,823

(22) Filed: Jul. 6, 2005

(65) Prior Publication Data
US 2006/0009558 A1    Jan. 12, 2006

(51) Int. Cl.
*C08K 5/08* (2006.01)
*C08K 5/23* (2006.01)
*C08K 5/34* (2006.01)

(52) U.S. Cl. .............. 106/494; 106/496; 106/498; 524/90; 524/195; 524/358

(58) Field of Classification Search ............... 524/90, 524/190, 195, 358; 106/494, 496, 488
See application file for complete search history.

(56) References Cited

U.S. PATENT DOCUMENTS

| 2,447,462 | A | * | 8/1948 | Harsh et al. ............... 524/156 |
| 4,755,012 | A | | 7/1988 | Kojima |
| 5,372,864 | A | * | 12/1994 | Weaver et al. ............ 428/36.92 |
| 5,688,899 | A | * | 11/1997 | Strand et al. .............. 528/279 |
| 5,893,959 | A | | 4/1999 | Muellich |
| 5,973,038 | A | | 10/1999 | Weaver |
| 6,759,458 | B2 | * | 7/2004 | Reil ............................. 524/89 |
| 2002/0002225 | A1 | * | 1/2002 | Reil ............................. 524/358 |
| 2005/0228085 | A1 | * | 10/2005 | Koshida et al. ............... 524/90 |

* cited by examiner

*Primary Examiner*—Tae H Yoon (57) ABSTRACT

Thermoplastic resin compositions suitable for laser welding are disclosed, which include a mixture of neutral anthraquinone blue dye with other red dye to absorb visible light with wavelength less than 700 nm and transmit a laser beam with wavelength at 800 nm to 1200 nm and to enhance weldability.

1 Claim, 3 Drawing Sheets

COLORED THERMOPLASTIC RESIN COMPOSITIONS FOR LASER WELDING, SPECIFIC NEUTRAL ANTHRAQUINONE DYES AS COLORANTS THEREFOR, AND MOLDED PRODUCT THEREFROM

This application is a continuation of U.S. application Ser. No. 10/047,686, filed Nov. 13, 2001, and claims the benefit of U.S. Provisional Application No. 60/247,647, filed Nov. 13, 2000.
NOTE TO POSSIBLY ADD REFERENCE TO EARLIER PROVISIONAL APPLICATION, TO BE DETERMINED

FIELD OF THE INVENTION

The instant invention relates to thermoplastic resin compositions with specific anthraquinone dyes. More particularly, the inventions relates to such compositions having improved laser weldability.

BACKGROUND OF THE INVENTION

It is known in the art to join together two articles of resins (and respectively opaque and transparent) by positioning them in contact with each other, transmitting a predetermined amount of laser beam focusing on the junction of them and causing the junction portion to be melted and joined together ("laser welding"). Several advantages flow from laser welding versus conventional methods of joining plastic parts.

For example, laser welding is widely known for its simple operation, labor savings, improvement of productivity, clear joints, and reduction of production cost. It is useful in various applications including the preparation of molded articles, including hollow shapes, in automobile industries and electric and electronic industries. Recently, work has intensified in the area of blends of thermoplastic resin and a colorant containing an organic dye or pigment. Better control of the conversion of laser energy to heat is achieved by the addition of such colorants to the resins. Laser beams penetrate through transparent articles positioned closer to the laser beam source, and are largely absorbed in the opaque article, which has a relatively higher absorption coefficient in comparison with the aforementioned transparent article. Careful attention to the amount of the colorants therein results in the junction portion being melted and the articles joined together.

See for example Japanese Published (Koukoku) Patent No.62-49850, and Japanese Published (Koukoku) Patent No.5 (93)-42336. Other resin compositions associated with the laser welding are described in U.S. Pat. No. 5,893,959 which discloses transparent and opaque workpiece parts welded together by a laser beam along a joining zone. Both parts contain black dye and pigments such as carbon black to cause them to offer a substantially homogenous visual impression even after welding.

Other illustrations of the laser welding of compositions are found in the U.S. Pat. No. 5,893,959. For example, the color of the thermoplastic components may be black (carbon black or nigrosine), which is commonly and widely used in the automobile industries and other applications. However, carbon black and nigrosine can not transmit a laser beam with a main wavelength in infra-red region (1200 nm to 800 nm), such as Nd:YAG laser and a diode laser which are of wide use in industries.

Surprisingly, it has now been found that thermoplastic resin compositions both black in appearance can be used for laser-welded molded articles, and both for the transparent and opaque parts subjected to the laser beam. A significantly improved transmission to near-infrared light of the laser beam, with excellent and balanced heat-resistance and mechanical properties as required in automobile applications is achieved by including a specific weight percentage of black dyes.

The object of the present invention is to offer a thermoplastic resin composition capable of offering moldings which appear in black, offer excellent thermal resistance, and are transparent to a laser beam, in particular to the near-infrared light region. A further object of the invention is to provide select anthraquinone blue dyes which offer minimal discoloration during molding and in high temperature applications. A feature of the invention is the compositions herein can provide a substantially homogenous visual black impression of transparent and opaque articles that appears in black and absorbs the laser beam largely by containing black dyes, welded together by the laser beam, and possess excellent and balanced heat-resistance and mechanical properties as required in automotive parts, electric/electronic components, mechanical components, and many other applications. The aforementioned objects, features and advantages will become better understood upon having reference to the following description of the invention herein.

SUMMARY OF THE INVENTION

This invention relates to an improved thermoplastic resin compositions for laser welding comprised of thermoplastic resin and a black colorant comprising at least neutral anthraquinone dye which imparts color of blue, absorbs visible light with wave length less than 700 nm and transmits a laser beam with wavelength at 800 nm to 1200 nm. In addition to said neutral anthraquinone dye, other red dye which transmit the laser beam with wavelength at 800 nm to 1200 nm in infra-red region, such as perinone dyes or monoazo complex dyes can be present at predetermined weight ratio.

The present invention, which allows the sated objective to be attained, concerns a thermoplastic resin composition for laser welding comprising:
1) thermoplastic resin; and,
2) a laser beam transmitting black colorant comprising neutral anthraquinone dye of formula [I] or [II]

wherein formula [I] is wherein $R^{55}$ and $R^{58}$, which may be the same or different, are independently selected from alkyl groups having 1 to 18 carbon atoms; and $R^{56}$ and $R^{59}$, which may be the same or different, are independently selected from the group consisting of alkyl, aryl, alkenyl, alkoxy, amino, N-alkylamide, N-arylamide, acyl, acylamide, alkoxycarbonyl, hydroxy, and carboxy groups and halogen atom; and $R^{57}$ and $R^{60}$, which may be the same or different, are independently selected from the group consisting of H, alkyl, aryl, alkenyl, alkoxy, amino, N-alkylamide, N-arylamide, acyl, acylamide, carboxy, alkoxycarbonyl, and hydroxy groups and halogen atom, and wherein formula [II] is wherein and $R^{64}$, which may be the same or different, are independently selected from the group consisting of H, alkyl, alkenyl, aryl, alkoxy, amino, N-alkylamide, N-arylaminde, acyl, acylamide, carboxy, alkoxycarbonyl, hydroxy group, halogen atom, formula [II-a], and $P^1$ is $NR^{66}$ or CO, wherein $R^{66}$ is H, alkyl, or aryl groups.

formula [II-a] is:

wherein $P^2$ is NH or NHCO; $R^{65}$ is H, alkyl, aryl, alkoxy, amino, hydroxy, or halogen atom.

With these components, thermoplastic resin compositions for laser welding offer improvements in moldability, solubility in the thermoplastic resin, bleeding and blooming-resistance, transparency to wavelengths of a laser beam at 800 nm to 1200 nm and resistance to chemicals. Another advantage is that the composition provides the greater color value to produce the black colorant because of the said neutral anthraquinone dye of formula [I] or [II] as a major component of said colorant and higher heat resistance. Therefore, the compositions of the present invention comprising the black colorant comprising at least said neutral anthraquinone dye as the major component are extremely suitable for thermoplastic resins which requiring melt temperature higher than 300° C. during molding operation.

The compositions of the invention may also contain other yellow dyes in addition to the mixture of anthraquinone dyes with red dyes as one of components of black dyes used as a colorant of the composition, preferably anthraquinone yellow dyes.

The actual amount of respective dyes which are useful in the practice of the invention will depend upon kind of thermoplastic resins blended with the dyes, the desired colors, the desired depth of shade and thickness of molded articles of the composition of the invention.

BRIEF DESCRIPTION OF THE DRAWINGS

The invention will be better understood upon having reference to the drawings herein.

DETAILED DESCRIPTION OF THE INVENTION

Examples of the anthraquinone dyes of Formulas [I] and [II] having the above-mentioned properties used as the main component forming the black dye contained in the composition of the invention are listed in Tables 1 and 2 respectively.

TABLE 1

| Pro. Ex. No | $R^{55}$ | $R^{56}$ | $R^{57}$ | $R^{58}$ | $R^{59}$ | $R^{60}$ |
|---|---|---|---|---|---|---|
| I-1 | $CH_3$ | $CH_3$ | H | $CH_3$ | $CH_3$ | H |
| I-2 | $CH_3$ | $CH_3$ | $CH_3$ | $CH_3$ | $CH_3$ | $CH_3$ |
| I-3 | $CH_3$ | $C_2H_5$ | $C_2H_5$ | $CH_3$ | $C_2H_5$ | $C_2H_5$ |
| I-4 | $C_2H_5$ | $C_2H_5$ | $CH_3$ | $C_2H_5$ | $C_2H_5$ | $CH_3$ |
| I-5 | $C_2H_5$ | $C_2H_5$ | H | $C_2H_5$ | $C_2H_5$ | H |
| I-6 | $CH_3$ | $C_{12}H_{25}$ | H | $CH_3$ | $C_{12}H_{25}$ | H |
| I-7 | $CH_3$ | $OCH_3$ | H | $CH_3$ | $OCH_3$ | H |
| I-8 | $CH_3$ | $CH_3$ | Cl | $CH_3$ | $CH_3$ | Cl |
| I-9 | $CH_3$ | $CH_3$ | $C_4H_9$ | $CH_3$ | $CH_3$ | $C_4H_9$ |
| I-10 | $CH_3$ | $CH_3$ | OH | $CH_3$ | $CH_3$ | OH |

Pro. Ex. No. = Product Example Number

TABLE 2

| Pro. Ex. No | $P^1$ | $R^{61}$ | $R^{62}$ | $R^{63}$ | $R^{64}$ |
|---|---|---|---|---|---|
| II-1 | NH | OH | H | OH | H |
| II-2 | NH | Cl | H | Cl | H |
| II-3 | NH | H | Br | H | Br |
| II-4 | NH | $CH_3$ | $CH_3$ | H | H |
| II-5 | $NCH_3$ | H | H | H | H |
| II-6 | NH | $NH_2$ | H | $NH_2$ | H |
| II-7 | NH | H | H | H | H |
| II-8 | NH | OH | H | H | H |
| II-9 | NH | anilino | H | anilino | H |
| II-10 | NH | benzamide | H | benzamide | H |
| II-11 | CO | $NHC_4H_9$ | H | $NHC_4H_9$ | H |
| II-12 | CO | $NH_2$ | H | $NH_2$ | H |

Pro. Ex. No. = Product Example Number

The above mentioned formula dyes offer superior color value when forming the black color, as well as high heat resistance.

Various additional dyes (like red, orange, and yellow dye forming black color) in the composition of the invention are reviewed below.

The perinone dyes which are mixed with the above-mentioned anthraquinone dyes for use as a black colorant comprised in the composition of the invention are known products of formula [III].

formula [III]:

The perinone dyes which are mixed with the anthraquinone to produce a black dye may be used alone or in combination thereof.

Preferred perinone dyes used in the composition of the invention when solubility and/or dispersion in the resin are considered, are those of formula [IV], formula [IV]

wherein P and Q, which may be the same or different, are independently constituent units which can be represented by the following formula [IV-a] to [IV-c]. $R^{14}$ to $R^{29}$, which may be the same or different, are independently an atom or a group selected from the group consisting of H, halogen atom such as Cl, Br, alkyl group having 1 to 18 carbon atoms, alkoxy group having 1 to 18 carbon atoms, aralkyl group, aryl group; $m^6$ is the number of 1 or 2.

formula [IV-a]

formula [IV-b]

formula [IV-c]

Dyes which belong to the class of perinone dyes listed in color index are for example C.I.Solvent Orange 60, 78, C.I.Solvent Red 135, 162, 178, 179, C.I.Violet 29, C.I.Pigment Orange 43, C.I.Pigment Red 149. If solubility and dispersibility in the resin are enhanced, solvent type dyes are preferred.

Examples of the perinone dyes of formula [IV] are illustrated below in Table 3.

TABLE 3

| Pro. Ex. No | P | Q | $m^6$ |
|---|---|---|---|
| IV-1 | Formula [IV-b], $R^{18} = R^{19} = R^{20} = R^{21} = R^{22} = R^{23} = H$ | Formula [IV-a], $R^{14} = R^{15} = R^{16} = R^{17} = H$ | 1 |
| IV-2 | Formula [IV-b], $R^{18} = R^{19} = R^{20} = R^{21} = R^{22} = R^{23} = H$ | Formula [IV-a], $R^{14} = R^{15} = R^{16} = R^{17} = Cl$ | 1 |
| IV-3 | Formula [IV-b], $R^{18} = R^{19} = R^{20} = R^{21} = R^{22} = R^{23} = H$ | Formula [IV-c], $R^{24} = R^{25} = R^{26} = R^{27} = R^{28} = R^{29} = H$ | 1 |
| IV-4 | Formula [IV-a], $R^{14} = R^{15} = R^{16} = R^{17} = H$ | Formula [IV-b], $R^{18} = R^{19} = R^{20} = R^{21} = R^{22} = R^{23} = H$ | 1 |
| IV-5 | Formula [IV-b], $R^{18} = R^{19} = R^{20} = R^{21} = R^{22} = R^{23} = H$ | Formula [IV-c], $R^{24} = R^{26} = R^{27} = R^{28} = R^{29} = H, R^{25} = OC_2H_5$ | 1 |
| IV-6 | Formula [IV-b], $R^{18} = R^{19} = R^{20} = R^{21} = R^{22} = R^{23} = H$ | Formula [IV-a], $R^{14} = R^{15} = R^{17} = H, R^{16}$ = benzoyl | 1 |
| IV-7 | Formula [IV-b], $R^{18} = R^{19} = R^{20} = R^{22} = R^{23} = H, R^{21} = C_4H_9$ | Formula [IV-a], $R^{14} = R^{17} = H$ | 2 |
| IV-8 | Formula [IV-b], $R^{18} = R^{19} = R^{20} = R^{21} = R^{22} = R^{23} = H$ | Formula [IV-c], $R^{24} = R^{26} = R^{27} = R^{28} = R^{29} = H, R^{25}$ = phenyl | 1 |
| IV-9 | Formula [IV-b], $R^{18} = R^{19} = R^{20} = R^{21} = R^{22} = R^{23} = H$ | Formula [IV-a], $R^{15} = R^{16} = R^{17} = H, R^{14} = Br$ | 1 |
| IV-10 | Formula [IV-b], $R^{18} = R^{19} = R^{20} = R^{21} = R^{22} = R^{23} = H$ | Formula [IV-a], $R^{15} = R^{16} = R^{17} = H, R^{14}$ = COOH | 1 |

Pro. Ex. No. = Product Example Number

The monoazo complex dyes which are mixed with the anthraquinone dyes of formula [I] or formula [II] to produce a black dye for use as colorant comprised in the composition of the invention, can be represented by formula [V].

Formula [V] is:

wherein $R^{30}$ and $R^{31}$, which may be the same or different, are Cl, $SO_2R^{32}$, $SO_2(-R^{33})(-R^{34})$, or H; wherein $R^{33}$ and $R^{34}$, which may be the same or different, are independently hydrogen atom, linear or branched C1-C4 alkyl; $R^{32}$ is linear or branched C1-C4 alkyl; $L_3$ and $L_4$ are independently O or COO; $(D)^+$ is hydrogen ion, cation of alkali metals, ammonium ion, cations of organic amine including aliphatic primary, secondary and tertiary amines, or quaternary ammonium ion; $K^2$ is an integer; $m^2$ is 0, 1 or 2; $M^2$ is selected from metals of ionic valency from 2 to 4 (such as Zn, Sr, Cr, Al, Ti, Fe, Zr, Ni, Mn, B[boron] and Co), preferably metal of trivalent metal such as Cu or trivalent metal such as Cr, Co, Ni, and Al.

and $B^1$ and $B^2$ are represented by formula [V-a] or formula [V-b].

wherein $R^{35}$ and $R^{37}$, which may be the same of different, are Cl, $SO_2R^{32}$, $SO_2(-R^{33})(-R^{34})$, or H; $R^{33}$ and $R^{34}$, which may be the same or different, are independently hydrogen atom, linear or branched C1-C4 alkyl; and $R^{36}$ and $R^{38}$, which may be the same or different, are independently hydrogen atom, linear or branched C1-C18 alkyl, carboxyl, hydroxyl, C1-C18 alkoxy, amino or halogen atoms.

Suitable cations for use in the above-mentioned monoazo complex dyes are $H^+$; cations of alkali metal, ammonium ion, cations of organic amine including aliphatic primary, secondary and tertiary amines, quaternary ammonium ion.

Suitable amines for use in producing the above-mentioned monoazo complex dyes and common in dyestuffs include aliphatic amine, alicyclic amine, alkoxyalkyl amine, amine having alkanol, diamine, amine of guanidine derivatives, and aromatic amine.

Examples of the monoazo complex dyes of formula [V], wherein $B^1$ and $B^2$ are of the formula [V-a] are below and in Table 4.

TABLE 4

Formula [V-c]:

| Pro. Ex. No | $R^{30}$ | $R^{31}$ | $R^{35}$ | $R^{36}$ | $M^2$ | $L_3$ | $L_4$ | $m^2$ | $K^2(D)^+$ |
|---|---|---|---|---|---|---|---|---|---|
| V-1 | H | H | H | H | Cr | COO | COO | 1 | $H^+$ |
| V-2 | Cl | Cl | $SO_2NH_2$ | H | Cr | O | O | 1 | $H^+$ |
| V-3 | $SO_2NH_2$ | $SO_2NH_2$ | $SO_2NH_2$ | H | Cr | O | O | 1 | $H^+$ |

TABLE 4-continued

Formula [V-c]:

| Pro. Ex. No | $R^{30}$ | $R^{31}$ | $R^{35}$ | $R^{36}$ | $M^2$ | $L_3$ | $L_4$ | $m^2$ | $K^2(D)^+$ |
|---|---|---|---|---|---|---|---|---|---|
| V-4 | Cl | Cl | $SO_2NH_2$ | H | Co | O | O | 1 | $H^+$ |
| V-5 | $SO_2NH_2$ | $SO_2NH_2$ | H | H | Ni | O | O | 1 | $H^+$ |
| V-6 | H | H | $SO_2NH_2$ | H | Cu | COO | COO | 1 | $H^+$ |
| V-7 | H | H | H | H | Cr | COO | COO | 1 | $C_4H_9CH(C_2H_5)OC_3H_6N^+H_3$ |
| V-8 | Cl | Cl | $SO_2NH_2$ | H | Cu | O | O | 1 | $C_{12}H_{25}N^+H_2(CH_2CH_2O)_2H$ |
| V-9 | Cl | Cl | $SO_2NH_2$ | H | Cr | O | O | 1 | $Na^+$ |
| V-10 | Cl | $SO_2NH_2$ | H | Cl | Co | O | O | 1 | $H^+$ |

Pro. Ex. No. = Product Example Number

Examples of the monoazo complex dyes of formula [V], wherein $B^1$ and $B^2$ are of the formula [V-b] are below and in Table 5.

TABLE 5

Formula [V-d]:

| Pro. Ex. No | $R^{30}$ | $R^{31}$ | $R^{35}$ | $R^{36}$ | $M^2$ | $L_3$ | $L_4$ | $m^2$ | $K^2(D)^+$ |
|---|---|---|---|---|---|---|---|---|---|
| V-11 | $SO_2NH_2$ | $SO_2NH_2$ | H | H | Co | O | O | 1 | $H^+$ |
| V-12 | H | H | $SO_2NH_2$ | H | Cr | COO | COO | 1 | $H^+$ |

TABLE 5-continued

Formula [V-d]:

| Pro. Ex. No | $R^{30}$ | $R^{31}$ | $R^{35}$ | $R^{36}$ | $M^2$ | $L_3$ | $L_4$ | $m^2$ | $K^2(D)^+$ |
|---|---|---|---|---|---|---|---|---|---|
| V-13 | Cl | Cl | H | H | Co | O | O | 1 | $C_4H_9CH(C_2H_5)OC_3H_6N^+H_3$ |
| V-14 | $SO_2NH_2$ | $SO_2NH_2$ | $SO_2NH_2$ | H | Cr | O | O | 1 | $NH_4^+$ |
| V-15 | Cl | Cl | $SO_2NH_2$ | H | Co | COO | COO | 1 | $H^+$ |
| V-16 | H | H | $SO_2NH_2$ | H | Co | COO | COO | 1 | $H^+$ |

Pro. Ex. No. = Product Example Number

We can obtain a black colorant having superior heat resistance by combining specific neutral anthraquinone dyes with the above mentioned monoazo complex red dyes or yellow dyes.

The above mentioned monoazo complex dyes offer superior heat resistance.

The anthrapyridone dyes which are mixed with the anthraquinone dyes of formula [I] or formula [II] to produce a black dye for use as colorants of the invention, can be represented by formula [VI], formula [VI]

wherein $R^{67}$ to $R^{71}$, which may be the same or different, are independently selected from the group consisting of H, alkyl, aryl, alkenyl, alkoxy, amino, hydroxy, halogen atom, acyl, acyloxy, acylamide, acyl-N-alkylamide, carboxyl, alkoxycarbonyl, cyclohexylamide, sulfonyl, or formula [VI-a]; and at least one of $R^{67}$ to $R^{74}$ is of sulfonyl;

wherein $P^3$ is C—$R^{72}$ or N; $R^{72}$ is H, alkyl, aryl, alkoxy, benzoyl, or benzyl; wherein $(G)^{s+}$ represents ammonium ion or a cation derived from organic amine compounds or a basic dye; wherein s is 1 or 2, $m^5$ is an integer from 1 to 4 and $K^5$ is the ratio of $m^5/s$;

formula [IV-a]

and further wherein $P^4$ is O or NH, and $R^{73}$ to $R^{75}$, which may be the same or different, are independently selected from the group consisting of H, alkyl, aryl, alkenyl, alkoxy, amino, N-alkylamide, N-arylamide, hydroxy, halogen atom, acyl, acyloxy, acylamido, acyl-N-alkylamide, carboxyl, alkoxycarbonyl, or sulfonyl.

Suitable amines for use in producing the above-mentioned anthrapyridone dyes in dyestuffs include aliphatic amine, alicyclic amine, alkoxyalkyl amine, amine having alkanol, diamine, amine of guanidine derivatives, and aromatic amine.

Examples of the anthrapyridone dyes of formula [VI] are given below in Table 6.

TABLE 6

| Pro. Ex. No | $R^{67}, R^{68}, R^{69}, R^{70}, R^{71}$ | $P^3$ | $K^5(G)^{\square+}$ |
|---|---|---|---|
| VI-1 | $R^{68} = R^{69} = R^{71} = H, R^{67} = CH_3, R^{70} = $ formula [VI-a], Formula [VI-a]: $P^4 = NH, R^{73} = SO_3^-, R^{74} = R^{75} = H$ | CH | $H_3N^+(CH_2)_6NH_2$ |
| VI-2 | $R^{68} = R^{69} = R^{71} = H, R^{67} = CH_3, R^{70} = $ formula [VI-a], Formula [VI-a]: $P^4 = NH, R^{73} = SO_3^-, R^{74} = R^{75} = H$ | CH | $(CH_3)_3N^+C_{12}H_{25}$ |
| VI-3 | $R^{68} = R^{69} = R^{71} = H, R^{67} = CH_3, R^{70} = $ formula [VI-a], Formula [VI-a]: $P^4 = NH, R^{73} = SO_3^-, R^{74} = R^{75} = H$ | CH | $C_2H_5OC_3H_6N^+H_3$ |
| VI-4 | $R^{68} = R^{69} = R^{71} = H, R^{67} = CH_3, R^{70} = $ formula [VI-a], Formula [VI-a]: $P^4 = NH, R^{73} = SO_3^-, R^{74} = CH_3, R^{75} = H$ | CH | $C_4H_9N^+H_3$ |
| VI-5 | $R^{68} = R^{69} = R^{71} = H, R^{67} = CH_3, R^{70} = $ formula [VI-a], Formula [VI-a]: $P^4 = NH, R^{73} = SO_3^-, R^{74} = CH_3, R^{75} = H$ | CH | N-trimethyl-N-benzyl Anmmonium |
| VI-6 | $R^{68} = R^{69} = R^{71} = H, R^{67} = CH_3, R^{70} = $ formula [VI-a], Formula [VI-a]: $P^4 = NH, R^{73} = R^{74} = SO_3^-, R^{75} = H$ | CH | $2(CH_3)_4N^+$ |
| VI-7 | $R^{68} = R^{69} = R^{71} = H, R^{67} = CH_3, R^{70} = $ formula [VI-a], Formula [VI-a]: $P^4 = NH, R^{73} = SO_3^-, R^{74} = CH_4H_9, R^{75} = H$ | CH | $C_{12}H_{25}N^+H_2(CH_2CH_2O)_2H$ |
| VI-8 | $R^{68} = R^{69} = R^{71} = H, R^{67} = CH_3, R^{70} = $ formula [VI-a], Formula [VI-a]: $P^4 = NH, R^{73} = SO_3^-, R^{74} = Cl, R^{75} = H$ | CH | N-trimethyl-N-benzyl Anmmonium |
| VI-9 | $R^{68} = R^{69} = R^{71} = H, R^{67} = CH_3, R^{70} = $ formula [VI-a], Formula [VI-a]: $P^4 = NH, R^{73} = SO_3^-, R^{74} = CH_3, R^{75} = H$ | N | $C_2H_5OC_3H_6N^+H_3$ |
| VI-10 | $R^{68} = R^{69} = R^{71} = H, R^{67} = CH_3, R^{70} = $ formula [VI-a], Formula [VI-a]: $P^4 = NH, R^{73} = SO_3^-, R^{74} = C_8H_{17}, R^{75} = H$ | N | $C_{12}H_{25}N^+H_3$ |
| VI-11 | $R^{68} = R^{69} = R^{71} = H, R^{67} = H, R^{70} = $ formula [VI-a], Formula VI-a: $P^4 = NH, R^{73} = SO_3^-, R^{74} = R^{75} = CH_3$ | $C-C_4H_9$ | Bis(p-methylphenyl) guanidine anmmonium |
| VI-12 | $R^{67} = R^{69} = R^{71} = H, R^{68} = $ formula [VI-a]-1, $R^{70} = $ formula [VI-a]-2, Formula [VI-a]-1: $P^4 = O, R^{73} = SO_3^-, R^{74} = C_{13}H_{27}, R^{75} = H$ Formula [VI-a]-2: $P^4 = NH, R^{73} = SO_3^-, R^{74} = R^{75} = CH_3$ | C-benzoyl | $(CH_3)_3N^+C_{12}H_{25}$ |
| VI-13 | $R^{67} = R^{69} = R^{71} = H, R^{68} = $ formula [VI-a]-1, $R^{70} = $ formula [VI-a]-2, Formula [VI-a]-1: $P^4 = O, R^{73} = SO_3^-, R^{74} = CH_3, R^{75} = H$ Formula [VI-a]-2: $P^4 = NH, R^{73} = SO_3^-, R^{74} = R^{75} = CH_3$ | C-benzoyl | N-trimethyl-N-benzyl anmmonium |
| VI-14 | $R^{68} = R^{69} = R^{71} = H, R^{67} = CH_3, R^{70} = $ formula [VI-a], Formula [VI-a]: $P^4 = O, R^{73} = SO_3^-, R^{74} = R^{75} = H$ | C-benzoyl | $(C_4H_9)_4N^+$ |
| VI-15 | $R^{68} = R^{69} = R^{71} = H, R^{67} = CH_3, R^{70} = $ formula [VI-a], Formula [VI-a]: $P^4 = NH, R^{73} = SO_3^-, R^{74} = R^{75} = H$ | CH | N-trimethyl-N-benzyl anmmonium |
| VI-16 | $R^{68} = R^{69} = R^{71} = H, R^{67} = CH_3, R^{70} = $ formula [VI-a], Formula [VI-a]: $P^4 = NH, R^{73} = SO_3^-, R^{74} = CH_3, R^{75} = H$ | CH | $H_3N^+(CH_2)_6NH_2$ |
| VI-17 | $R^{68} = R^{69} = R^{71} = H, R^{67} = CH_3, R^{70} = $ formula [VI-a], Formula [VI-a]: $P^4 = NH, R^{73} = SO_3^-, R^{74} = C_8H_{17}, R^{75} = H$ | N | Diphenylguanidine anmmonium |

Pro. Ex. No. = Product Example Number

The anthraquinone dyes which absorb less than 500 nm and have colors such as yellow, orange and red, can be mixed with the neutral anthraquinone to produce black colors are described in the COLOR INDEX below.

Red Dyes:

C.I. Solvent Red 52, 57, 111, 114, 136, 137, 138, 139, 143, 144, 145, 146, 147, 148, 149, 150, 151, 152, 155, 156, 168, 169, 170, 171, 172, 177, 181, 190, 191, 194, 199, 200, 201.

Orange Dyes:

C.I. Solvent Orange 35, 55, 64, 65, 66, 68, 69, 71, 77, 86, 87, 163.

Yellow Dyes:

C.I. Solvent Yellow 100, 109, 117, 125, 156, 158, 163 or C.I. Vat Yellow 1, 2, 3.

Compositions suitable to produce the black dyes are reviewed immediately below.

EXAMPLE 1

Black Dye

The neutral anthraquinone dye of the formula [I-2]: perinone red dye of the formula [IV-3]: anthraquinone yellow dye of the following formula [a] in a weight ratio of 5:3:2.

Formula [a]

EXAMPLE 2

Black Dye

The neutral anthraquinone dye of the formula [1-3]: perinone red dye of the formula [IV-3]: anthraquinone yellow dye of the following formula [a] in a weight ratio of 5:4:1.

EXAMPLE 3

Black Dye

The neutral anthraquinone dye of the formula [II-9]: perinone red dye of the formula [IV-2]: anthraquinone yellow dye of the formula [a] in a weight ratio of 6:3:1.

EXAMPLE 4

Black Dye

The neutral anthraquinone dye of the formula [II-3]: perinone red dye of the formula [IV-3]: anthraquinone yellow dye of the following formula [b] in a weight ratio of 3:2:1.

Formula [b]

EXAMPLE 5

Black Dye

The neutral anthraquinone dye of the formula [I-4]: monoazo complex dye of the formula [V-2]: anthraquinone yellow dye of the formula [a] in a weight ratio of 6:2:1.

EXAMPLE 6

Black Dye

The neutral anthraquinone dye of the formula [I-5]: monoazo complex dye of the formula [V-3]: anthraquinone yellow dye of the formula [b] in a weight ratio of 5:2:1.

EXAMPLE 7

Black Dye

The neutral anthraquinone dye of the formula [II-4]: monoazo complex dye of the formula [V-2]: anthraquinone yellow dye of the formula [a] in a weight ratio of 5:3:2.

EXAMPLE 8

Black Dye

The neutral anthraquinone dye of the formula [I-1]: anthrapyridone dye of the formula [VI-5]: anthraquinone yellow dye of the following formula [a] in a weight ratio of 5:4:1.

EXAMPLE 9

Black Dye

The neutral anthraquinone dye of the formula [I-2]: anthrapyridone dye of the formula [VI-2]: monoazo complex dye of the formula [V-16]: in a weight ratio of 5:3:1.

EXAMPLE 10

Black Dye

The neutral anthraquinone dye of the formula [II-4]: monoazo complex dye of the formula [V-2]: anthraquinone yellow dye of the formula [b] in a weight ratio of 6:3:1.

The resins utilized as the molded resins for laser welding may be any resin as long as they are thermoplastic resins. Polyamide resins and polyester resins are preferred from the point of view of heat-resistance and transmitting property, although other thermoplastic resins including polycarbonate resins can be used as well, alone, in combination with each other, or in combination with those preferable resins above. .

Several examples of polyamide resins suitable for use in the present invention include condensation products of dicarboxylic acids and diamines, condensation products of aminocarboxylic acids and ring-opening polymerization products of cyclic lactams. Examples of dicarboxylic acids useful in this application include adipic acid, azelaic acid, sebacic acid, dodecanedioic acid, isophthalic acid and terephthalic acid. Examples of suitable diamines include tetramethylene diamine, hexamethylene diamine, octamethylene diamine, nonamethylene diamine, dodecamethylene diamine, 2-methylpentamethylene diamine, 2-methyloctamethylene diamine, trimethylhexamethylene diamine, bis(p-aminocyclohexyl) methane, m-xylene diamine and p-xylene diamine. As an example of aminocarboxylic acid, 11-aminododecanoic acid can be used. Examples of useful cyclic lactams include caprolactam and laurolactam. Specific examples of condensation products and ring-opening polymerization products include aliphatic polyamides such as nylon 6, nylon 66, nylon 46, nylon 610, nylon 612, nylon 11, nylon 12, semi-aromatic polyamides such as polymetaxylene adipamide (nylon MXD-6), polyhexamethylene terephthalamide (nylon 6T), polyhexamethylene isophthalamide (nylon 6I) and polynonamethylene terephthalamide (nylon 9T), and copolymers and mixtures of these polymers. Examples of useful copolymers include nylon 6/66, nylon 66/6I, nylon 6I/6T and nylon 66/6T.

A wide range of common polyester molding compositions useful for blending with colorants in the practice of the present invention are known in the art. These include polymers which are, in general, condensation products of dicarboxylic acids and diols. Dicarboxylic acids can be selected from the group consisting of adipic acid, azelaic acid, sebacic acid, dodecanedioic acid, terephthalic acid, isophthalic acid, naphthalenedicarboxylic acid and diphenyl dicarboxylic acid, and diols can be selected from the group consisting of ethylene glycol, propylene glycol, butanediol, hexanediol, neopentyl glycol, cyclohexanediol, and bisphenol A. Preferred polyesters include polyethylene terephtalate (PET), polypropylene terephthalate (3GT), polybutylene terephthalate (PBT), polyethylene 2,6-naphthalate (PEN), polycyclohexane dimethylene terephthalate (PCT) and copolymers and mixtures thereof. As the examples of the copolymers, some of dicarboxylic acids or some of diols can be added to the condensation products. Polyester polymers may be copolymerized a little amount of compnents like trimesic acid, trimellitic acid, pyromellitic acid, glycerol, and pentaerythritol which have more than 3 functional groups.

Additional other polymers including polycarbonate can also be presented, provided that the essential characteristics of the composition of the present invention are not substantially altered.

A black colorant useful in the composition of the invention preferably comprises a mixture of neutral anthraquinone dye which imparts colors of blue, absorbs visible light with wavelength less than 700 nm and transmits a laser beam with wavelength at 800 nm to 1200 nm in infra-red region with at least other red dyes which transmit the laser beam with wavelength at 800 nm to 1200 nm in infra-red region, such as perinone dyes or monoazo complex dyes, at predetermined weight ratios.

The black colorant containing the neutral anthraquinone dye is present in amounts of from 0.01 to 1% by weight, when the composition comprises polyamide 6 as at least the major component of the polyamide resin composition. The amount of the above-mentioned dye mixture may be determined by applications requiring different properties associated with the laser welding.

The composition of the present invention may contain an inorganic filler or reinforcing agent that includes, for example, fibrous reinforcement such as glass fiber and carbon fiber, glass beads, glass flakes, talc, kaolin, wollastonite, silica, calcium carbonate, pottassium titanate and mica. Preferable among them is glass fiber. Glass fibers suitable for use in the present invention are those generally used as reinforcing agents for thermoplastic resins and thermosetting resins.

One or more optional compounds selected from a wide variety of compounds tailored for different applications of the resin compositions can be contained in the composition according to the present invention.

Typically, additive compounds can include flame retardants, impact modifiers, viscosity modifiers, heat resistance improvers, lubricants, antioxidants and UV-and other stabilizers. The polyamide resin composition of the present invention may have such additive compounds in such amounts that they do not harm its characteristic properties.

In the present invention, there is provided thermoplastic resin compositions suitable for laser welding, which prepare transparent articles for laser beam to achieve welding together with the opaque article for laser beam. Suitable opaque articles and its compositions are described for example in DE-A-4432081.

Figure 1:
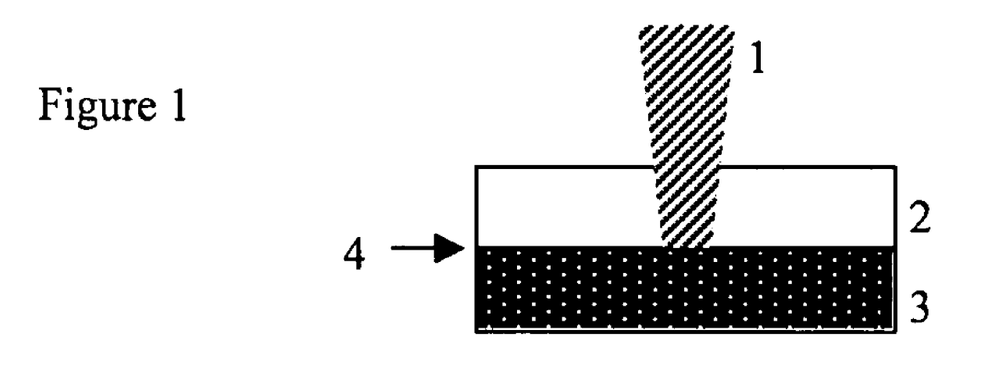
FIG. 1 is a view of the articles in contact with and with a laser beam applied thereto.
Figure 2:
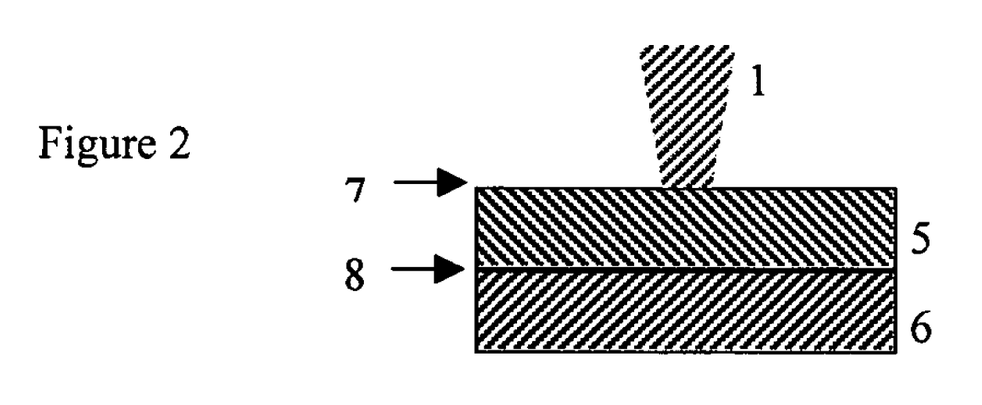
FIG. 2 is identical to FIG. 1, but with the articles of the same color.

Having reference to the drawings herein, FIG. 1 is an illustration of a conventional welding arrangement. A laser beam 1 is transmitted through the first article 2 to the second article 3 containing laser beam absorbing combination, and the surface 4 of the article 3 that have absorbed the laser energy is melted and pressed with the surface of the first article 2 to weld them together. As shown in FIG. 2, two thermoplastic components 5 and 6 must have different transmission and absorption coefficients and it is difficult to weld at surface 8 two articles having the same color. In FIG. 2 the laser beam 1 is applied to the surface 7 of the component 5.

Figure 3:
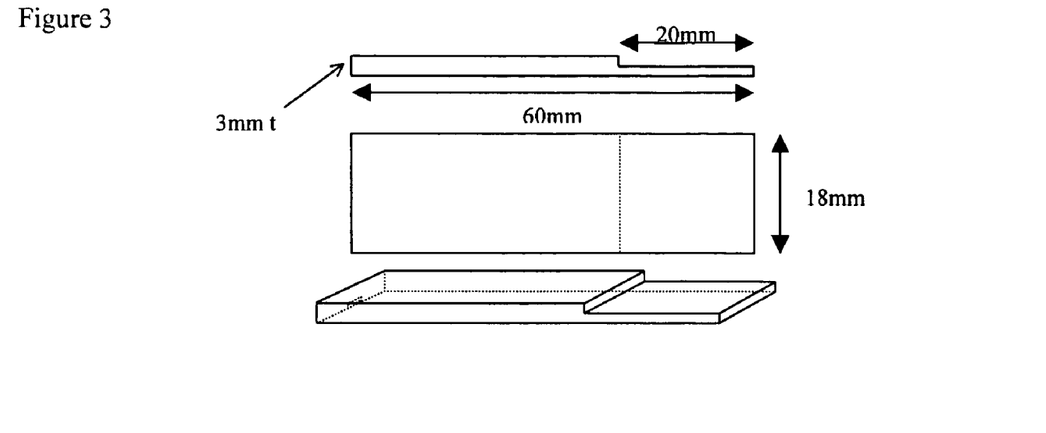
FIG. 3 illustrates a shape and dimensions of a test piece creating a notch in the test piece (60 mm×18 mm).
Figure 4:
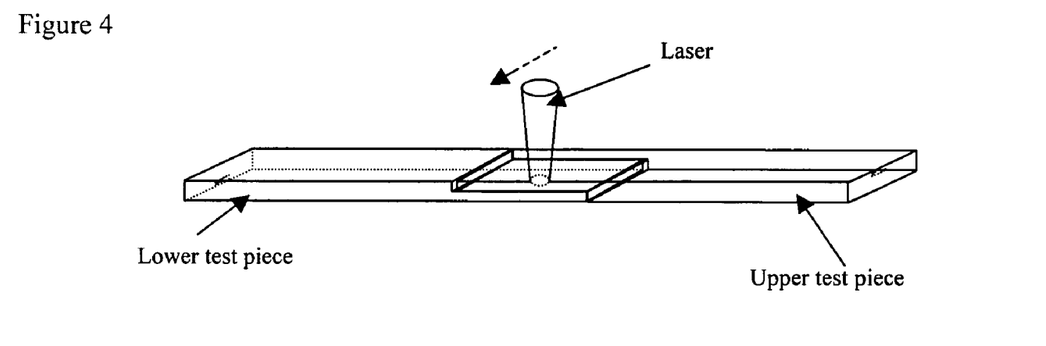
FIG. 4 is a perspective view of test pieces of FIG. 3 disposed close to each other for a laser welding test and relationship between the test pieces and laser beam.
Figure 5:
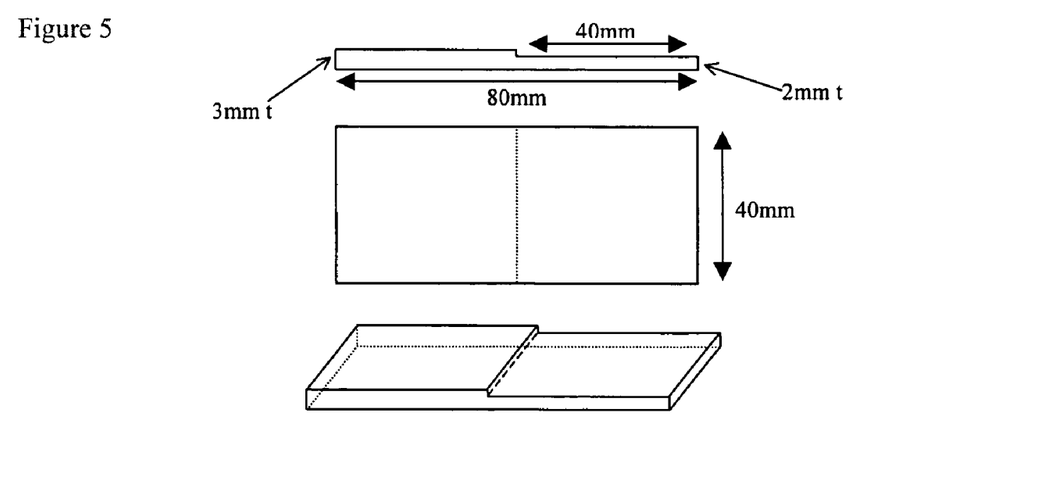
FIG. 5 illustrates a shape and dimensions of a test piece creating a notch in the test piece (80 mm×40 mm).
Figure 6:
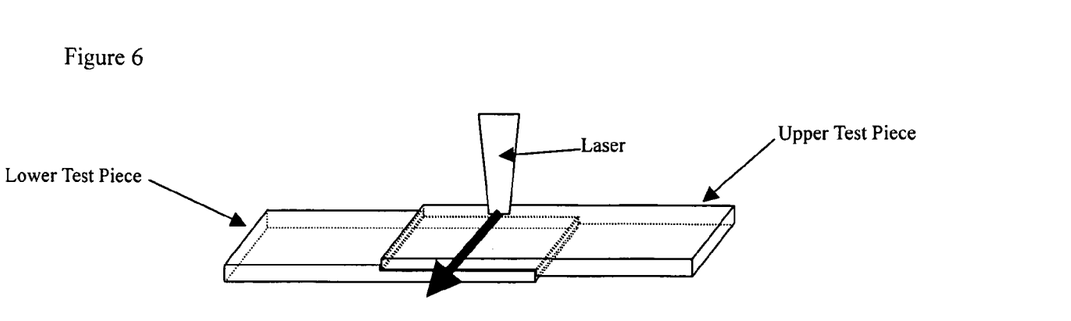
FIG. 6 is a perspective view of test pieces of FIG. 5 disposed close to each other for a laser welding test and relationship between the test pieces and laser beam

In FIGS. 3 and 5 herein, there is shown a lower test piece 10 used in the laser welding test of these examples. The noted dimensions creates a notch in the test piece 10. The upper test piece 9 is of the same construction and dimensions. In FIGS. 4 and 6, there is shown the joinder of the upper test piece 9 to lower test piece 10, and the movement of the laser 11 (in the direction of the arrow) to form the weld.

EXAMPLES

The present invention is illustrated by the following examples and comparative examples.

Example A

Unreinforced nylon 6 ZYTEL® pellets (available from El DuPont de Nemours & Co. under the name ZYTEL® 7301) was dried at 120° C. for more than 8 h using a drying apparatus, and weighed according to the following formulation.

| | |
|---|---|
| Nylon 6 | 400 g |
| Anthraquinone blue dye of the following formula [I-2] | 0.40 g |
| Perinone red dye of the following formula [IV-3] | 0.24 g |
| Anthraquinone yellow dye of the following formula [a] | 0.16 g |

The above formula product was agitated and mixed for 1 h in a stainless steel tumbler.

For this and all other testing involving this particular grade of nylon, A homogeneous, black experimental piece (48× 86×3 (mm)) having excellent appearance and surface gloss with no color unevenness was obtained after the aforementioned resulting mixture was injection molded by a usual method at 250° C. cylinder temperature and 60° C. molding temperature using an injection molding machine (Product of Kawaguchi Tekko Co., trade name: K50-C). The experimental piece obtained after keeping in an injection molding machine for 15 minutes was fadeless.

Example B

| | |
|---|---|
| Nylon 6 (same as Example A) | 400 g |
| Anthraquinone blue dye of the following formula [I-4] | 0.36 g |
| Perinone red dye of the following formula [IV-3] | 0.28 g |
| Anthraquinone yellow dye of the following formula [b] | 0.16 g |

The above formula product was agitated and mixed for 1 h in a stainless steel tumbler.

Test pieces were prepared and tested as described for Example A, above, and the results are reported in Table 7, below. The experimental piece obtained after keeping in an injection molding machine for 15 minutes was fadeless.

Comparative Example C

| | |
|---|---|
| Nylon 6 (same as Example A) | 400 g |
| Anthraquinone violet dye of the following formula [c] | 0.68 g |
| Quinopthalone yellow dye of the following formula [d] | 0.12 g |

The above formula product was agitated and mixed for 1 h in a stainless steel tumbler.

Test pieces were prepared and tested as described for Example A, above, and the results are reported in Table 7, below. The experimental piece obtained after keeping in an injection molding machine for 15 minutes was faded and uneven.

formula [c]:

Comparative Example D

| | |
|---|---|
| Nylon 6 (same as Example A) | 400 g |
| Anthraquinone green dye of the following formula [e] | 0.48 g |
| Anthraquinone red dye of the following formula [f] | 0.32 g |

The above formula product was agitated and mixed for 1 h in a stainless steel tumbler.

Test pieces were prepared and tested as described for Example A, above, and the results are reported in Table 7, below. The experimental piece obtained after keeping in an injection molding machine for 15 minutes was faded and uneven.

formula [e]:

formula [f]:

Comparative Example E

| | |
|---|---|
| Nylon (same as Example A) | 400 g |
| Anthraquinone green dye of the following formula [e] | 0.48 g |
| Disazo red dye of the following formula [g] | 0.32 g |

The above formula product was agitated and mixed for 1 h in a stainless steel tumbler.

Test pieces were prepared and tested as described for Example A, above, and the results are reported in Table 7, below. The experimental piece obtained after keeping in an injection molding machine for 15 minutes was faded and uneven.

formula [g]:

Comparative Example F

| | |
|---|---|
| Nylon 6 (same as Example A) | 400 g |
| Anthraquinone blue dye of the following formula [h] | 0.53 g |
| Perinone red dye of the following formula [IV-3] | 0.18 g |
| Anthraquinone yellow dye of the following formula [a] | 0.09 g |

The above formula product was agitated and mixed for 1 h in a stainless steel tumbler.

Test pieces were prepared and tested as described for Example A, above, and the results are reported in Table 7, below. The experimental piece obtained after keeping in an injection molding machine for 15 minutes was faded and uneven.

formula [h]:

TABLE 7

|  |  | Example A | Example B | Comparative Example C | Comparative Example D | Comparative Example E | Comparative Example F |
|---|---|---|---|---|---|---|---|
| Transmission | TA | 0.96 | 0.97 | 0.90 | 0.95 | 0.95 | 0.95 |
|  | TB | 1.00 | 1.02 | 0.85 | 0.86 | 0.94 | 0.97 |
| OD |  | 2.42 | 2.42 | 2.45 | 2.42 | 2.42 | 2.39 |
| Thermal Resistance ΔE |  | 0.46 | 0.38 | 1.73 | 1.55 | 1.62 | 1.86 |
| Moisture Resistance ΔE |  | 0.75 | 0.68 | 1.08 | 1.56 | 2.73 | 1.14 |
| TG/DTA Exothermic peak(° C.)/ Endothermic peak(° C.) |  | 363.3/ none | 359.1/ none | 320.9/ 179.5 | 369.7/ 154.6 | 367.2/ 196.2 | 327.4/ 102.4 |

This testing demonstrates that thermal and moisture resistance showed no deterioration in Examples A and B. Particularly, Examples A and B have no endothemic peak in TG/DAT analysis. This means that even if the composition such as Examples A and B are kept in an injection molding machine for a time (for instance, 15 minutes), the experimental piece obtained by molding has property not to fade. On the other hand, Comparative Examples C, D, E and F having endothemic peak in less than Nylon 6 melting point have great possibility to fade after molding in that same way. The bigger an injection molding machine is, more important heat keeping property in it is.

Example G

Unreinforced polyester (prepared from terephthalic acid and ethylene glycol the intrinsic viscosity of which is 0.85 when measured at 25° C. as a 1% solution in a mixed solution of phenol and dichlorobenzene with the weight ratio of 1/1) was dried at 120° C. for more than 8 h using a vacuum drying apparatus, and weighed according to the following formulation.

| Polyester | 400 g |
|---|---|
| Anthraquinone blue dye of the following formula [II-9] | 0.40 g |
| Perinone red dye of the following formula [IV-3] | 0.24 g |
| Anthraquinone yellow dye of the following formula [a] | 0.16 g |

The above formula product was agitated and mixed for 1 h in a stainless steel tumbler.

For this and all other testing involving this particular grade of polyester, A homogeneous, black experimental piece (48× 86×3 (mm)) having excellent appearance and surface gloss with no color unevenness was obtained after the aforementioned resulting mixture was injection molded by a usual method at 290° C. cylinder temperature and 60° C. molding temperature using an injection molding machine (Product of Kawaguchi Tekko Co., trade name: K50-C). The experimental piece obtained after keeping in an injection molding machine for 15 minutes was fadeless.

Example H

| Polyester (same as Example G) | 400 g |
|---|---|
| Anthraquinone blue dye of the following formula [I-2] | 0.40 g |
| Perinone red dye of the following formula [IV-3] | 0.24 g |
| Anthraquinone yellow dye of the following formula [a] | 0.16 g |

The above formula product was agitated and mixed for 1 h in a stainless steel tumbler.

Test pieces were prepared and tested as described for Example G, above, and the results are reported in Table 8, below. The experimental piece obtained after keeping in an injection molding machine for 15 minutes was fadeless.

Example I

| Polyester(same as Example G) | 400 g |
|---|---|
| Anthraquinone blue dye of the following formula [I-4] | 0.36 g |
| Perinone red dye of the following formula [IV-3] | 0.28 g |
| Anthraquinone yellow dye of the following formula [b] | 0.16 g |

The above formula product was agitated and mixed for 1 h in a stainless steel tumbler.

Test pieces were prepared and tested as described for Example G, above, and the results are reported in Table 8, below. The experimental piece obtained after keeping in an injection molding machine for 15 minutes was fadeless.

Comparative Example J

| Polyester (same as Example G) | 400 g |
|---|---|
| Anthraquinone violet dye of the following formula [c] | 0.68 g |
| Quinopthalone yellow dye of the following formula [d] | 0.12 g |

The above formula product was agitated and mixed for 1 h in a stainless steel tumbler.

Test pieces were prepared and tested as described for Example G, above, and the results are reported in Table 8, below. The experimental piece obtained after keeping in an injection molding machine for 15 minutes was faded and uneven.

Comparative Example K

| Polyester (same as Example G) | 400 g |
|---|---|
| Anthraquinone green dye of the following formula [e] | 0.48 g |
| Anthraquinone red dye of the following formula [f] | 0.32 g |

The above formula product was agitated and mixed for 1 h in a stainless steel tumbler.

Test pieces were prepared and tested as described for Example G, above, and the results are reported in Table 8, below. The experimental piece obtained after keeping in an injection molding machine for 15 minutes was faded and uneven.

Comparative Example L

| | |
|---|---|
| Polyester (same as Example G) | 400 g |
| Anthraquinone green dye of the following formula [e] | 0.48 g |
| Disazo red dye of the following formula [g] | 0.32 g |

The above formula product was agitated and mixed for 1 h in a stainless steel tumbler.

Test pieces were prepared and tested as described for Example G, above, and the results are reported in Table 8, below. The experimental piece obtained after keeping in an injection molding machine for 15 minutes was faded and uneven.

Comparative Example M

| | |
|---|---|
| Polyester(same as Example G) | 400 g |
| Anthraquinone blue dye of the following formula [h] | 0.53 g |
| Perinone red dye of the following formula [IV-3] | 0.18 g |
| Anthraquinone yellow dye of the following formula [a] | 0.09 g |

The above formula product was agitated and mixed for 1 h in a stainless steel tumbler.

Test pieces were prepared and tested as described for Example C, above, and the results are reported in Table 8, below. The experimental piece obtained after keeping in an injection molding machine for 15 minutes was faded and uneven.

in heat keeping property in an injection molding machine, the result same as Nylon 6 can be occured.

Test Procedures (1) Transmission Properties

Transmittance (T) in the range of 400 nm to 1200 nm of the test plates with laser beams having respective wavelengths of 940 nm(Semiconductor laser) and 1064 nm (YAG laser) was measured using a U-3410 spectrometer producted by Hitachi with 60 φ sphere photometer for wavelength from ultraviolet to nexr-infrared. The ratio (TA) of transmission with 940 nm: transmission with 1064 nm and the ratio (TB) of transmission with 940 nm: tarnsmission of natural resin are determined and compared between the examples.

(2) Appearance and Surface Gloss

Appearance of the test plates were evaluated by measuring Reflection Density (OD) of the test plates by Refelection Density meter TR-927 produced by Macbeth. Test plates having higher OD values are judged to have better surface smoothness and rich in gloss.

(3) Thermal Resistance

The amount of color fading and discoloration ΔE between "before" and "after" each test plate being placed and kept in an oven at 160° C. for 15 days was determined and measured using a colorimeter (produced by Juki, trade name: JP 7000).

(4) Moisture Resistance

The amount of color fading and discoloration ΔE between "before" and "after" each test plate being placed and kept in a thermoregulator at 80° C. (a humidity was 95%) for one week was determined and measured using a calorimeter (produced by Juki, trade name: JP 7000).

(5) TG(Thermogravimetric Alalyzers)/DTA (Differential Thermal Analyzers)

TG and DTA of each test colorant powder were measured using TG/DTA analyzers (prodcued by Seiko Instrument, trade name:SII EXSTAR 6000) in a heating furnace that air is introduced into at 200 ml/min, of which temperature is raised from 30 to 55° C. at 10 ° C./min then when reached to at 550° C. for 28 minutes.

TABLE 8

| | | Example G | Example H | Example I | Comparative Example J | Comparative Example K | Comparative Example L | Comparative Example M |
|---|---|---|---|---|---|---|---|---|
| Transmission | TA | 0.88 | 0.93 | 0.93 | 0.92 | 0.93 | 0.92 | 0.93 |
| | TB | 0.85 | 0.93 | 0.93 | 0.89 | 0.93 | 0.89 | 0.96 |
| OD | | 1.78 | 1.81 | 1.80 | 1.86 | 1.78 | 1.85 | 1.78 |
| Moisture Resistance ΔE | | 3.15 | 3.56 | 3.30 | 5.02 | 4.64 | 4.48 | 4.55 |
| Sublimation Test ΔE | | 5.32 | 9.72 | 7.07 | 19.33 | 12.36 | 11.97 | 17.42 |
| TG/DTA Exothermic peak(° C.)/ Endothermic peak(° C.) | | 532.8/ none | 363.3/ none | 359.1/ none | 320.9/ 179.5 | 369.7/ 154.6 | 367.2/ 196.2 | 327.4/ 102.4 |

This testing demonstrates that moisture resisitance showed no deterioration in Examples C, H and I. Particularly, Examples C, H and I showed low sublimation, compared with Comparative J, K, L and M. Therefore, even if thermoplastic resin composition colored by Examples C, H or I is put on higher temperature space as like automobile or electric industry, its colorant have property not to migrate other parts. And (6) Sublimation Test The amount of dye sublimation was determined by ΔE between before and after white tape attached on each test plate being placed and kept in an oven at 140° C. for 3 hours and was mesaured using a calorimeter (produced by Juki, trade name: JP 7000).

The white tape attached on the test plate having greater ΔE are judged to have greater sublimation.

Example N and Comparative Example O and P

Fiberglass reinforced nylon 6 (Zytel®73G30L, available from E. I. DuPont de Nemours and Co.) and dyes were dry-blended with the amount described in Table 9. The blended material was molded into two types of test pieces: one for mechanical properties, and the other for laser welding. Test pieces for mechanical properties were molded according to the ISO3167 on the Toshiba IS 170FIII injection molding machine, with cylinder temperature set at 260° C. and mold temperature at 80° C. Test pieces for laser welding, with dimensions illustrated as FIG. 3, were molded on the Sumitomo Juki 75T injection molding machine, with cylinder temperature set at 250° C. and mold temperature set at 80° C.

Tensile strength and elongation were measured according to ISO527 and notched Charpy impact strength was measured according to ISO179.

Laser welding was conducted using two of the test pieces described above, combined as illustrated in FIG. 4. The Example N and the Comparative Example O were used as Upper test piece and the Comparative Example P was used as Lower test piece. A diode laser (wavelength 940 nm, manufactured by Rofin-Sinar Laser GmbH) was irradiated with laser power at 50 W and various speeds, with 3 mm diameter. Tensile strength of the welded test pieces were measured on the Autograph (manufactured by Shimazu Seisakusho) by pulling apart at 5 mm/minute and its maximum load was recorded.

TABLE 9

|  |  | Example N | Comp. Ex O | Comp. Ex. P |
|---|---|---|---|---|
| 73G30L | kg | 4.9925 | 4.9925 | 4.99 |
| Blue dye formula [I-2] |  | 3.75 g |  |  |
| Red dye formula [IV-3] |  | 2.25 g |  |  |
| Yellow dye formula [a] |  | 1.50 g |  |  |
| Green dye formula [e] |  |  | 4.50 g |  |
| Red dye formula [g] |  |  | 3.00 g |  |
| Carbon black |  |  |  | 10 g |
| Tensile strength | MPa | 174 | 181 | 185 |
| Elongation | % | 3.9 | 4.2 | 3.4 |
| Notched Charpy | KJ/m$^2$ | 12.8 | 13.3 | 12.2 |
| Laser Welding at 50 W |  |  |  |  |
| 2.5 m/min | Kgf | 195 | 189 | — |
| 5 m/min | Kgf | 196 | 177 | — |
| 10 m/min | Kgf | 115 | 110 | — |

Example Q and Comparative Example R and S

Fiberglass reinforced nylon 66 (Zytel®70G33HS1L, available from E. I. DuPont de Nemours and Co.) and dyes were dry-blended with the amount described in the Table 10. The blended material was molded into two types of test pieces: one for mechanical properties, and another for laser welding. Test pieces for mechanical properties were molded according to the ISO3167 on the Toshiba IS 170FIII injection molding machine, with cylinder temperature set at 280° C. and mold temperature at 80° C. Test pieces for laser welding, with dimensions illustrated in FIG. 3, were molded on the Sumitomo Juki 75T injection molding machine, with cylinder temperature set at 270° C. and mold temperature set at 80° C.

Tensile strength and elongation were measured according to ISO527 and notched Charpy impact strength was measured according to ISO179.

Laser welding was conducted using two pieces of the test pieces described above, combined as illustrated in FIG. 4. The Example Q and the Comparative Example R were used as Upper test piece and the Comparative Example S was used as Lower test piece. Diode laser (wavelength 940 nm, manufactured by Rofin-Sinar Laser GmbH) was irradiated with the power at 80 W and at various speeds with 3 mm diameter. Tensile strength of the welded test pieces was measured on Autograph (manufactured by Shimazu Seisakusho) by pulling apart at 5 mm/minute and its maximum load was recorded.

TABLE 10

|  |  | Example Q | Comp. Ex. R | Comp. Ex. S |
|---|---|---|---|---|
| 70G33HS1L | kg | 4.9925 | 4.9925 | 4.99 |
| Blue dye formula [I-4] |  | 3.75 g |  |  |
| Red dye formula [IV-3] |  | 2.25 g |  |  |
| Yellow dye formula [a] |  | 1.50 g |  |  |
| Green dye formula [e] |  |  | 4.50 g |  |
| Red dye formula [g] |  |  | 3.00 g |  |
| Carbon black |  |  |  | 10 g |
| Tensile strength | MPa | 199 | 207 | 207 |
| Elongation | % | 3.4 | 3.8 | 3.2 |
| Notched Charpy | kJ/m$^2$ | 12.3 | 13.5 | 11.9 |
| Laser Welding at 80 W |  |  |  |  |
| 2.5 m/min | kgf | 97 | 75 | — |
| 5 m/min | kgf | 195 | 185 | — |
| 10 m/min | kgf | 194 | 187 | — |

Example T-Example V, Comparative Example W-AA

Pellets of unreinforced nylon 6 (Zytel®7301, available from E. I. DuPont de Nemours and Co.) and dyes were dry-blended with the amount described on the table 11. The blended material was molded into test pieces for laser welding, with dimension illustrated as FIG. 5, on the K50-C injection molding machine (manufactured by Kawaguchi Steel K.K.) with cylinder temperature set at 250° C. and mold temperature set at 60° C. Laser welding was conducted using two pieces of the test pieces described above, combined as illustrated in FIG. 6. Each Example from T to V and Comparative Example from W to Z was used as Upper test piece and Comparative Example AA was used as Lower test piece. Diode laser (wavelength 940 nm, manufactured by Rofin-Sinar Laser GmbH) was irradiated at 50 W power and with speed at 1 m/minute, with 3 mm diameter. Strength of the welded test pieces was measured on Autograph (manufactured by Shimazu Seisakusho) by pulling apart at 50 mm/minute and its maximum load was recorded.

TABLE 11

|  | Example T | Example U | Example V | Comp. Ex. W | Comp. Ex. X | Comp. Ex. Y | Comp. Ex. Z | Comp. Ex. AA |
|---|---|---|---|---|---|---|---|---|
| Nylon 6 | 400 g | 400 g | 400 g | 400 g | 400 g | 400 g | 400 g | 400 g |
| Blue dye formula [I-4] | 0.40 g |  |  |  |  |  |  |  |
| Red dye formula [IV-3] | 0.24 g | 0.24 g | 0.24 g |  |  |  | 0.18 g |  |

TABLE 11-continued

|  | Example T | Example U | Example V | Comp. Ex. W | Comp. Ex. X | Comp. Ex. Y | Comp. Ex. Z | Comp. Ex. AA |
|---|---|---|---|---|---|---|---|---|
| Yellow dye formula [a] | 0.16 g | 0.16 g | 0.16 g |  |  |  | 0.09 g |  |
| Blue dye formula [II-9] |  | 0.40 g |  |  |  |  |  |  |
| Blue dye formula [I-2] |  |  | 0.40 g |  |  |  |  |  |
| Violet dye formula [c] |  |  |  | 0.68 g |  |  |  |  |
| Yellow dye formula [d] |  |  |  | 0.12 g |  |  |  |  |
| Green dye formula [e] |  |  |  |  | 0.48 g | 0.48 g |  |  |
| Red dye formula [f] |  |  |  |  | 0.32 g |  |  |  |
| Red dye formula [g] |  |  |  |  |  | 0.32 g |  |  |
| Blue dye formula [h] |  |  |  |  |  |  | 0.53 g |  |
| NUBIAN COMPLEX BLACK G04 |  |  |  |  |  |  |  | 0.80 g |
| Transmittance at 940 nm (2 mm thick) | 170 | 151 | 292 | 194 | 195 | 171 | 188 | — |
| Laser Weld Strength (kgf) |  |  |  |  |  |  |  |  |

NUBIAN COMPLEX BLACK G04(Product name: product of Orient Chemical Industries Ltd): a mixture of carbon and nigrosine.

Example AB and Comparative Example AC-AE

Fiberglass reinforced polyester (prepared from terephthalic acid and ethylene glycol the intrinsic viscosity of which is 0.85 when measured at 25° C. as a 1% solution in a mixed solution of phenol and dichlorobenzene with the weight ratio of 1/1 and containing 30wt % chopped strand glass fibers 187H produced by Nippon Electric Glass Co., Ltd. based on a total weight of the polyester resin composition, and dried as described for xample G ) and dyes were dry-blended with the amount described in Table 13. The blended material was molded into two types of test pieces: one for mechanical properties, and the other for laser welding. Test pieces for mechanical properties were molded according to the ISO3167 on the Toshiba IS 170FIII injection molding machine, with cylinder temperature set at 290° C. and mold temperature at 60° C. Test pieces for laser welding, with dimension illustrated as FIG. 3, were molded on the Sumitomo Juki 75T injection molding machine, with cylinder temperature set at 280° C. and mold temperature set at 60° C.

Tensile strength and elongation were measured according to ISO527 and notched Charpy impact strength was measured according to ISO179.

Laser welding was conducted using two pieces of the test pieces described above, combined as illustrated in FIG. 4. The Example AB and the Comparative Example AC-AD were used as Upper test piece and the Comparative Example AE was used as Lower test piece. Diode laser (wavelength 940 nm, manufactured by Rofin-Sinar Laser GmbH) was irradiated with laser power at 50 W and regular speed, with 3 mm diameter. Tensile strength of the welded test pieces were measured on Autograph (manufactured by Shimazu Seisakusho) by pulling apart at 5 mm/minute and its maximum load was recorded.

TABLE 12

|  |  | Example AB | Comp. Ex. AC | Comp. Ex AD | Comp. Ex. AE |
|---|---|---|---|---|---|
| 73G30L | kg | 4.9925 |  | 4.9925 | 4.99 |
| Blue dye formula [I-2] |  | 3.75 g |  |  |  |
| Red dye formula [IV-3] |  | 2.25 g |  |  |  |
| Yellow dye formula [a] |  | 1.50 g |  |  |  |
| Violet dye formula [c] |  |  | 6.375 g |  |  |
| Yellow dye formula [d] |  |  | 1.125 g |  |  |

TABLE 12-continued

|  |  | Example AB | Comp. Ex. AC | Comp. Ex AD | Comp. Ex. AE |
|---|---|---|---|---|---|
| Green dye formula [e] |  |  |  | 4.50g |  |
| Red dye formula [g] |  |  |  | 3.00g |  |
| Carbon black |  |  |  |  | 10 g |
| Tensile strength | MPa | 135 | 133 | 135 | 150 |
| Elongation | % | 4.3 | 4.3 | 4.0 | 2.7 |
| Notched Charpy | KJ/m² | 13.0 | 14.0 | 13.0 | 10.5 |
| Laser Welding at 50 W 5 m/min Kgf |  | 150 | 144 | 145 | — |

What is claimed is:

1. A black colorant suitable for being mixed with a thermoplastic resin and for laser welding, comprising a mixture of neutral anthraquinone dye of formula [I] which imparts color of blue, absorbs visible light with wavelength less than 700 nm and transmit a laser beam with wavelength at 800 nm to 1200 nm in infra-red region with at least one other red dye which transmits the laser beam with wavelength at 800 nm to 1200 nm in infra-red region, absorbing visible light with wavelength less than 700 nm, formula [I] is;

wherein $R^{55}$ and $R^{58}$, which may be the same or different, are independently selected from alkyl groups having 1 to 18 carbon atoms; and $R^{58}$ and $R^{59}$, which may be the same or different, are independently selected from the group consisting of alkyl, aryl, alkenyl, alkoxy, amino, N-alkylamide, N-arylamide, acyl, acylamide. alkoxycarbonyl, hydroxy, carboxy groups and halogen atom; and $R^{57}$ and $R^{60}$, which may be the same or different, are independently selected from the group consisting of H, alkyl, aryl, alkenyl, alkoxy, amino, N-alkylamide, N-arylamide, acyl, acylamide, carboxy, alkoxycarbonyl, hydroxy groups and halogen atom.

* * * * *

UNITED STATES PATENT AND TRADEMARK OFFICE
CERTIFICATE OF CORRECTION

PATENT NO. : 7,513,947 B2 Page 1 of 1
APPLICATION NO. : 11/175823
DATED : April 7, 2009
INVENTOR(S) : Koshida et al.

It is certified that error appears in the above-identified patent and that said Letters Patent is hereby corrected as shown below:

Column 28, line 65, delete "$R^{58}$" and insert -- $R^{56}$ --

Signed and Sealed this

Fifteenth Day of September, 2009

David J. Kappos
*Director of the United States Patent and Trademark Office*